United States Patent
Leigh et al.

(10) Patent No.: US 7,841,241 B2
(45) Date of Patent: Nov. 30, 2010

(54) SURFACE ACOUSTIC WAVE (SAW) BASED PRESSURE SENSOR

(75) Inventors: Arthur Leigh, Banbury (GB); Paul Edward Vickery, Towcester (GB)

(73) Assignee: Transense Technologies PLC, Bicester, Oxon (GB)

( * ) Notice: Subject to any disclaimer, the term of this patent is extended or adjusted under 35 U.S.C. 154(b) by 285 days.

(21) Appl. No.: 11/920,893

(22) PCT Filed: Apr. 27, 2006

(86) PCT No.: PCT/GB2006/001546

§ 371 (c)(1),
(2), (4) Date: Nov. 21, 2007

(87) PCT Pub. No.: WO2006/125941

PCT Pub. Date: Nov. 30, 2006

(65) Prior Publication Data

US 2009/0100935 A1   Apr. 23, 2009

(30) Foreign Application Priority Data

May 26, 2005   (GB) .................................. 0510885.7

(51) Int. Cl.
*G01L 9/00* (2006.01)
(52) U.S. Cl. .......................................... 73/754; 73/753
(58) Field of Classification Search .................. None
See application file for complete search history.

(56) References Cited

U.S. PATENT DOCUMENTS

| | | | |
|---|---|---|---|
| 4,216,401 A | 8/1980 | Wagner | |
| 4,295,102 A * | 10/1981 | Schmidt et al. | ............... 331/65 |
| 4,326,423 A | 4/1982 | Hartemann | |
| 6,329,739 B1 * | 12/2001 | Sawano | ................... 310/313 R |
| 6,516,665 B1 * | 2/2003 | Varadan et al. | .......... 73/504.01 |
| 6,541,893 B2 * | 4/2003 | Zhu et al. | ............... 310/313 B |
| 6,984,332 B2 * | 1/2006 | Varadan et al. | ................. 216/2 |
| 7,165,455 B2 * | 1/2007 | Magee et al. | ................. 73/650 |
| 2004/0216526 A1 | 11/2004 | Cook et al. | |

FOREIGN PATENT DOCUMENTS

| | | |
|---|---|---|
| EP | 0018248 | 10/1980 |
| GB | 2037987 | 7/1980 |
| GB | 2386684 | 9/2003 |
| JP | 61080024 | 4/1986 |
| JP | 61207942 | 9/1986 |
| JP | 5026751 | 2/1993 |
| WO | WO 2004/099748 | 11/2004 |

* cited by examiner

*Primary Examiner*—Lisa M Caputo
*Assistant Examiner*—Jermaine Jenkins
(74) *Attorney, Agent, or Firm*—Keusey & Associates, P.C.

(57) ABSTRACT

A SAW based pressure sensor having a base 2a with an aperture 3 formed therein and a substrate 4 mounted on the base so as to completely overlie the aperture. The substrate 4 is adhered to base 2a so as to form a fluid tight seal around the periphery of the aperture 3. A first SAW resonator 5 is mounted on the substrate 4 wholly within the region overlying the aperture 3, with two further SAW resonators 6, 7 being mounted on the substrate wholly within a region which is stiffened by adhesion to the underlying base 2a, such that the two further SAW resonators 6, 7 are completely decoupled from the strain field arising in the substrate due to deflections thereof.

8 Claims, 1 Drawing Sheet

SURFACE ACOUSTIC WAVE (SAW) BASED PRESSURE SENSOR

CROSS REFERENCE TO RELATED APPLICATIONS

This application claims the priority benefit of PCT application PCT/GB2006/001546 filed on Apr. 27, 2006 and UK application 0510885.7 filed on May 26, 2005, both of which are hereby incorporated by reference.

BACKGROUND OF THE INVENTION

1. Field of the Invention

The present invention relates to Surface Acoustic Wave (SAW) based pressure sensors and in particular to such sensors in which only a part of the SAW substrate is pressure sensitive

2. The Prior Art

SAW based sensors are known in which a plurality of SAW devices are mounted on a single substrate, the substrate being divided into strained and unstrained regions with SAWs being mounted on both regions so as to enable both temperature and pressure to be monitored, or at least to enable temperature compensated pressure readings to be taken. For example, GB 0302311.6 discloses a SAW pressure and temperature sensor in which three SAWs are mounted on a single substrate, one of the SAWs being mounted on a portion of the substrate whose strain field varies with various in pressure whilst the other two are mounted on regions of the substrate which are substantially decoupled from the strain field, the information from the threes SAWs enabling both pressure and temperature readings to be calculated for the environment surrounding the substrate.

In GB 0302311.6, pressure variations in the surrounding environment are transmitted to the substrate by a mechanical connection between a pressure sensitive diaphragm and the strained region of the substrate. The substrate is then either simply supported or built in at the boundaries of the strained region so as to decouple the surrounding regions from the strain field. This approach has the drawback, however, that it is not completely effective for isolating the strained region of the substrate.

An alternative approach known in the prior art, for example in MEMs silicon and quartz devices, is to use a thick substrate which is substantially in-sensitive to pressure and locally etch a region of the substrate to make a thin diaphragm zone which is pressure sensitive, transducing elements being placed on this diaphragm zone for detection of pressure and also on the un-etched areas for temperature monitoring. The whole substrate is then exposed to the surrounding atmosphere, but only the diaphragm zone is responsive thereto and hence only the output of the elements mounted on that zone varies with pressure. This approach has the drawback, however, that the etching process if expensive and time consuming.

SUMMARY OF THE INVENTION

According to the present invention there is provided a SAW based pressure sensor comprising a base having an aperture formed therein and a substrate mounted on the base so as to completely overlie the aperture, the substrate being adhered to the base so as to form a fluid tight seal around the periphery of the aperture, a first SAW resonator being mounted on the substrate wholly within the region overlying the aperture and a second SAW resonator being mounted on the substrate wholly within a region which is stiffened by adhesion to the underlying base.

A pressure sensor in accordance with the invention has the advantage that it simplifies the construction of the sensor since the region of the substrate overlying the aperture effectively acts as a diaphragm, thereby removing the need to provide a separate diaphragm with a mechanical contact to SAW substrate, which, in turn, would necessitate pre-loading the diaphragm element in order to ensure contact is maintained over the full pressure range. Furthermore, the substrate effectively forms a bi-laminar structure with the base where it is bonded thereto, stiffening the substrate away from the aperture so as particularly effectively to decouple the SAWs mounted thereon from the strain arising in the region of the substrate overlying the aperture due distortions thereof.

Preferably, the substrate is of uniform thickness. Since the remainder of the substrate is stiffened by virtue of it being bond to the base, the use of a thin substrate does not have any adverse effect on the decoupling of the second resonator from the strain field. As a result, the thickness of the substrate can be chosen based wholly on the sensitivity desired for the region overlying the aperture, which is to be pressure sensitive and hence the need for etching of the substrate is removed. This has the advantage of reducing manufacturing costs.

Preferably the base is part of a housing that further includes side walls and a lid which together with the base define a fluid tight internal chamber, which is chargeable with a reference pressure to which the whole of the upper surface of the substrate is exposed, the lower surface of the region of the substrate overlying the aperture being exposed to the atmosphere surrounding the housing and said region distorting in response to a pressure differential between the reference pressure and the surrounding pressure.

In a particularly preferred embodiment, a third SAW resonator is mounted on the substrate wholly within the region which is stiffened by adhesion to the underlying base, said third SAW resonator being inclined at least to the second SAW. In this way, the sensor can be used to obtain readings of both pressure and temperature of the surrounding atmosphere.

Each resonator is preferably connected via busbars on the substrate, which is a piezoelectric substrate, and two sensor output connector pins.

BRIEF DESCRIPTION OF THE DRAWINGS

In order that the invention may be well understood, there will now be described an embodiment thereof, given by way of example, reference being made to the accompanying drawings, in which.

DETAILED DESCRIPTION OF THE PREFERRED EMBODIMENT

Figure 1:
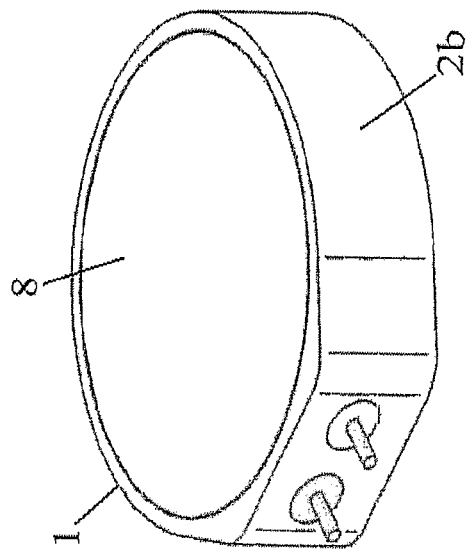
FIG. 1 is a top view of a pressure sensor assembly according to the invention with its lid part removed.
Figure 2:
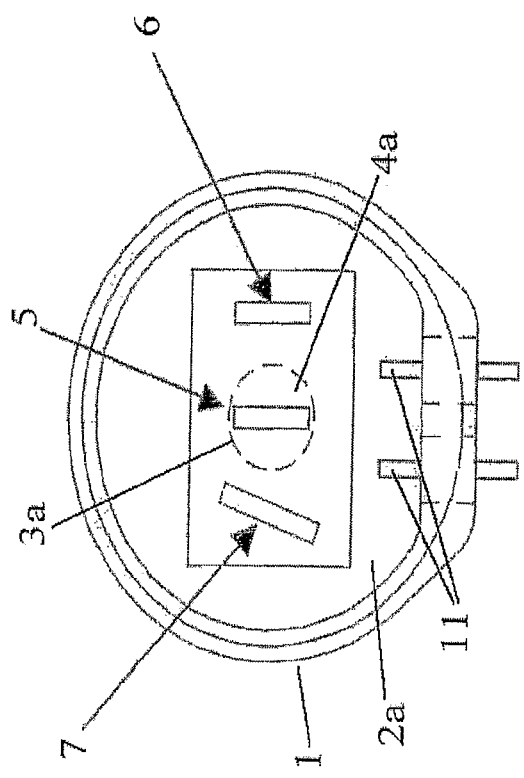
FIG. 2 is a perspective view of the assembly of FIG. 1.
Figure 3:
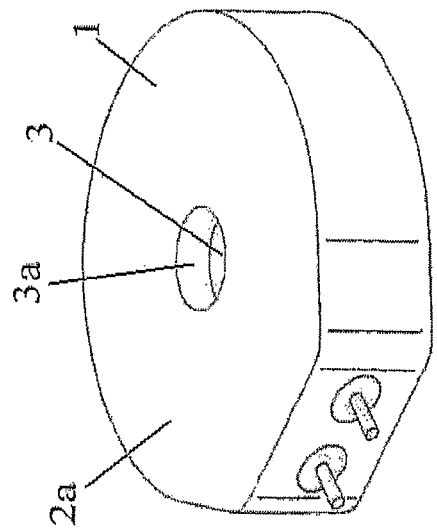
FIG. 3 is a top view of the assembly of FIG. 1 with the lid part in place.
Figure 4:
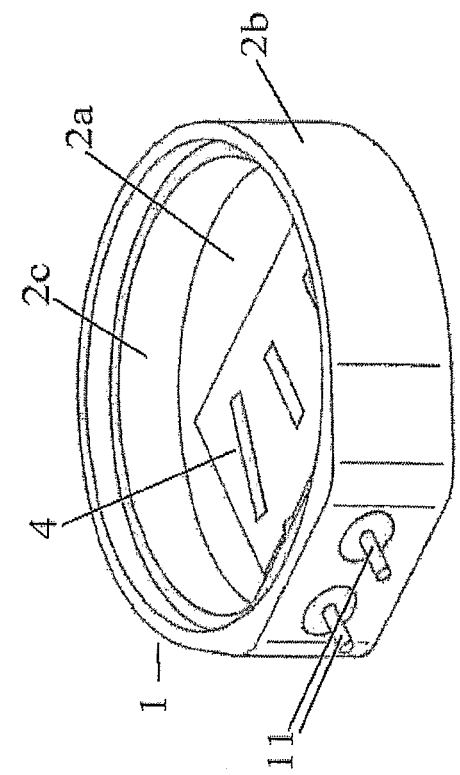
FIG. 4 is a bottom view of the assembly of FIG. 1.

With reference to FIGS. 1, 2, 3 and 4, there is shown a package 1 having a base 2a in which is formed a through-opening 3 and sides 2b which define a chamber 2c. A substrate 4 of uniform thickness is fastened to the inner surface of the base so as to completely overlie the through-opening 3 using a suitable method of adhesion which provides a completely hermetic seal around the periphery 3a of the through opening 3, the dimensions of the through-opening 3 being set to provide optimum strain due to deflections of the overlying region 4a of the substrate 4. A first SAW device 5 is mounted on the region 4a of the inner surface of the substrate 4 which completely overlies the through-opening 3 in order to measure variations in the strain field resulting from deflections of that overlying region 4a. Two further SAW devices 6, 7 are also mounted on the inner surface of the substrate 4 remote from the through-opening 3 so as to be completely decoupled from the strain field arising in the first region 4a due to deflections thereof. The three SAWs 5, 6, 7 are connected via busbars on the substrate 3 to sensor output connection pin 11a.

The through-opening 3 in the base 2a of the package 1 exposes the outer surface of the overlying region 4a of the substrate to the surrounding atmosphere so that variations in the pressure thereof causes the overlying region 4a to deflect or distort, that distortion being localised to the overlying region 4a only due to the adhesion of the substrate to the base 2a. Those distortions therefore only produce a variation in the output of the SAW device 5 mounted thereon. All three SAW devices 5, 6, 7, however, are in fluid communication with the atmosphere inside the chamber 2c and hence respond to temperature variations, the pressure independent changes in the output of the second and third SAWs 6,7 enabling both pressure and temperature information to be calculated in a well-known manner. At least one charging valve 11b is provided in the housing for facilitating setting of the reference pressure within the chamber.

The invention claimed is:

1. A SAW based pressure sensor comprising:
   a base having an aperture formed therein as a through-opening;
   a substrate mounted on said base so as to completely overlie the aperture, said substrate being adhered to said base so as to form a fluid tight seal around the periphery of the through-opening;
   a first SAW resonator being mounted on said substrate wholly within the region overlying the aperture and a second SAW resonator being mounted on said substrate wholly within a region which is stiffened by adhesion to the underlying base; and
   a housing having side walls and a lid which together with said base define a fluid tight internal chamber, said chamber being chargeable with a reference pressure to which the whole of the upper surface of the substrate is exposed, the lower surface of the region of the substrate overlying the aperture being exposed to the atmosphere surrounding the housing, wherein said region distorts in response to a pressure differential between the reference pressure and the surrounding pressure, varying the strain field to which the first SAW is exposed.

2. The pressure sensor according to claim 1, wherein said substrate is of uniform thickness.

3. The pressure sensor according to claim 2, further comprising:
   at least one charging valve disposed in said housing for facilitating setting of the reference pressure within the chamber.

4. The pressure sensor according to claim 3, further comprising:
   a third SAW resonator mounted on the substrate wholly within the region which is stiffened by adhesion to the underlying base, said third SAW resonator being inclined with respect to said second SAW resonator.

5. A SAW based pressure sensor comprising:
   a base having an aperture formed therein;
   a substrate mounted on said base so as to completely overlie the aperture, said substrate being adhered to said base so as to form a fluid tight seal around the periphery of the aperture;
   a first SAW resonator being mounted on said substrate wholly within the region overlying the aperture and a second SAW resonator being mounted on said substrate wholly within a region which is stiffened by adhesion to the underlying base; and
   a housing having side walls and a lid which together with said base define a fluid tight internal chamber, said chamber being chargeable with a reference pressure to which the whole of the upper surface of the substrate is exposed, the lower surface of the region of the substrate overlying the aperture being exposed to the atmosphere surrounding the housing, wherein said region distorts in response to a pressure differential between the reference pressure and the surrounding pressure, varying the strain field to which the first SAW is exposed.

6. The pressure sensor according to claim 5, wherein said substrate is of uniform thickness.

7. The pressure sensor according to claim 5, further comprising:
   at least one charging valve disposed in said housing for facilitating setting of the reference pressure within said chamber.

8. The pressure sensor according to claim 5, further comprising:
   a third SAW resonator mounted on said substrate wholly within the region which is stiffened by adhesion to the underlying base, said third SAW resonator being inclined with respect to said second SAW resonator.

* * * * *